United States Patent [19]

Fujiyama et al.

[11] 4,146,671

[45] Mar. 27, 1979

[54] MAGNETIC RECORDING SUBSTANCE

[75] Inventors: Masaaki Fujiyama; Hiroshi Kato, both of Odawara, Japan

[73] Assignee: Fuji Photo Film Co., Ltd., Minami-ashigara, Japan

[21] Appl. No.: 768,534

[22] Filed: Feb. 14, 1977

[30] Foreign Application Priority Data

Feb. 13, 1976 [JP] Japan .................................. 51-13964

[51] Int. Cl.$^2$ .............................................. G11B 5/70
[52] U.S. Cl. ................................ 428/328; 252/62.54; 252/62.56; 252/62.58; 360/134; 428/329; 428/539
[58] Field of Search ............... 428/402, 900, 539, 320, 428/328, 329, 412, 480, 500, 532; 427/127, 128, 132; 252/62.54, 62.56, 62.58; 360/134; 346/135

[56] References Cited

U.S. PATENT DOCUMENTS

| 3,928,709 | 12/1975 | Audran et al. | 428/539 |
| 3,996,392 | 12/1976 | Berg et al. | 428/900 |
| 4,010,310 | 3/1977 | Kubota et al. | 428/900 |

*Primary Examiner*—Stanley S. Silverman
*Attorney, Agent, or Firm*—Armstrong, Nikaido, Marmelstein & Kubovcik

[57] ABSTRACT

In a magnetic recording substance comprising a nonmagnetic support member and a magnetic recording layer provided thereon and consisting essentially of a ferromagnetic powder and a binder, the content of calcium component contained in the ferromagnetic powder is previously adjusted to 0.001% by weight or less.

5 Claims, 1 Drawing Figure

U.S. Patent  Mar. 27, 1979  4,146,671

MAGNETIC RECORDING SUBSTANCE

BACKGROUND OF THE INVENTION

1. Field of the Invention

This invention relates to a magnetic recording substance having excellent characteristics and more particularly, it is concerned with a magnetic recording medium of the type having a coating of magnetizable particles in a binder on a non-magnetic support.

2. Description of the Prior Art

Up to the present time, magnetic recording substances have been produced by dispersing magnetic powders such as iron oxides, magnetic alloys, chromium dioxide, etc. in synthetic resin binders and coating the dispersion onto non-magnetic supports such as plastic films, papers, metal sheets, etc. When such a magnetic recording substance is subjected to recording of signals and to reproducing of this recording, it is brought into contact with various magnetic heads and guide poles of a magnetic recording device and travelled with sliding. As an inevitable phenomenon thereof, the magnetic layer is worn out through the above described contact to form fragments which are scattered and adhered or accumulated on magnetic heads or guide poles. Consequently, it becomes impossible to read clearly signals at recording or reproducing by such a magnetic recording substance or a phenomenon of drop out takes place, so that the magnetic recording substance does not function normally.

SUMMARY OF THE INVENTION

It is an object of the present invention to provide a magnetic recording substance having excellent characteristics.

It is another object of the present invention to provide a magnetic recording medium whereby adhesions are scarcely brought out even under high humidity during use.

It is a further object of the invention to provide a method for decreasing adhesions to a magnetic recording substance under a high humidity.

These objects can be attained by a magnetic recording substance comprising on a non-magnetic support member a magnetic recording layer consisting essentially of a ferromagnetic powder and a binder, the content of calcium ion contained in the ferromagnetic powder being previously adjusted to 0.001% by weight or less.

BRIEF DESCRIPTION OF THE DRAWING

The FIGURE is a microscopic photograph (magnification: 260 times) of an adhered crystal deposited on a magnetic recording substance.

DETAILED DESCRIPTION OF THE INVENTION

Of late, severer requirements for magnetic recording substances have increased with the enlargement of their use and shortening of the recording wavelengths and decreasing of drop out have been required. We, the inventors, have made studies as to various problems under the short wavelength recording, in particular, drop out, head clogging, etc., and consequently have found that substantially white powders occur from almost all of the magnetic recording tapes used in the art. This powder occurs in a larger amount under a high humidity. When a magnetic recording substance in such a state is subject to a magnetic recording and reproducing device, there is produced a visible adhered substance and drop out and head clogging are often caused. These hindrances are more markedly found in the case of a shorter recording wavelength or a narrower head gap.

The inventors have further made various studies on the above described phenomenon to find the following facts:

(1) When a magnetic recording substance is used under a high humidity, an adhered substance is increased due to the increase of friction factor $\mu$ and the deterioration of mechanical properties of the magnetic layer and, in addition, even when a magnetic recording substance is allowed to stand at a high humidity, an adhered substance is increased.

(2) It is assumed that the principal component of this adhered substance contains calcium and is represented by $CaSO_4 \cdot xH_2O$ (x being possibly 2).

(3) This adhered substance is not generated if the ferromagnetic powder is previously washed with water free from calcium ions.

(4) In the case of removing this adhered substance, it is effective to conduct the washing for goethite $(FeOOH)_2$, $Fe_3O_4$, $\gamma\text{-}Fe_2O_3$, $\alpha\text{-}Fe_2O_3$ or their intermediate products.

Based on these facts, the inventors have further made efforts to find a method for decreasing an adhered substance under a high humidity and consequently have found that this problem can be solved by reducing the content of calcium ions contained in a ferromagnetic powder to 0.001% by weight or less. The present invention is based on this finding.

That is to say, when, in the production of a magnetic recording substance, a ferromagnetic powder is previously subjected to removal of calcium contained therein and then coated with a binder onto a non-magnetic support to form a magnetic layer, occurrence of an adhered substance is scarcely found even if the magnetic recording substance is exposed to a high humidity during use and, accordingly, the troublesome problems in short wavelength recording, i.e., drop out or head clogging can remarkably be decreased.

Therefore, the present invention provides a magnetic recording substance having on a non-magnetic support a magnetic recording layer consisting principally of a ferromagnetic powder and a binder, characterized in that calcium ions contained in the ferromagnetic powder are previously reduced to 0.001% by weight or less. In order to suppress the content of calcium in the above described range in this magnetic recording substance, calcium ions or sulfate ions in the reaction materials and washing water should be kept as little as possible. As a method for decreasing sulfate ions, it is effective to carry out rewashing after dehydration and reduction of goethite. The most effective method for decreasing an adhered substance comprises reacting calcium ion-free starting materials to give goethite, washing with calcium ion-free water, subjecting to dehydration and reduction and then washing again with calcium ion-free water.

According to the present invention, the following advantages or merits are given:

(1) Even in a case where a magnetic layer is wetted or allowed to stand in an atmosphere of high humidity, there is produced no deposition from the magnetic layer.

(2) Therefore, the intended use of the magnetic recording substance of the present invention is enlarged. It can be used even under severe conditions, for example, high temperatures and high humidities, since it is not affected by dewing resulting from a rapid change of temperature or humidity.

(3) When using the magnetic recording substance of the present invention, an adhered substance to the guide pole of a magnetic recording and reproducing device is decreased, thus preventing the increase of scratches and drop out. In the prior art magnetic recording substance, travelling thereof becomes impossible due to an adhered substance in extreme cases, while the magnetic recording substance of the invention does not encounter such a hindrance.

(4) This adhered substance causes head clogging through adhesion to the surface of a magnetic head, while the present invention does not have such a hindrance.

The magnetic coating compositions used in the present invention contain predominantly ferromagnetic powders, binders and coating solvents, optionally with dispersing agents, lubricants, abrasives and antistatic agents.

Suitable binders which can be used in the present invention include hitherto known thermoplastic resins, thermosetting resins and mixtures thereof.

Useful examples of the ferromagnetic powders which can be used in the present invention are, for example, $\gamma$-Fe$_2$O$_3$, Co-doped $\gamma$-Fe$_2$O$_3$, Fe$_3$O$_4$, Co-doped Fe$_3$O$_4$, Berthollide compounds of $\gamma$-Fe$_2$O$_3$ and Fe$_3$O$_4$ (FeO$_x$: $1.33 < x < 1.50$), Co-doped Berthollide compounds of $\gamma$-Fe$_2$O$_3$ and Fe$_3$O$_4$ (FeO$_x$: $1.33 < x < 1.50$), CrO$_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973, U.S. Pat. Nos. 3,026,215, 3,031,341, 3,100,194, 3,242,005, 3,389,014, British Pat. Nos. 752,659, 782,762 and 1,007,323, French Pat. No. 1,107,654 and West German Pat. (OPI) No. 1,281,334.

The ferromagnetic fine powders have preferably a particle size of about 0.2 to 1 micron in length with a length to width ratio of 1:1 to 20:1.

Suitable thermoplastic resins are those which have a softening point of about 150° C. or lower, a mean molecular weight of about 10,000 to 200,000 and a degree of polymerization of the order of about 100 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, epoxy-polyamide resins, mixtures of high molecular weight polyester resins and isocyanate prepolymers, mixtures of methacrylic acid salt copolymers and diisocyanate prepolymers, mixtures of polyesterpolyols and polyisocyanates, ureaformaldehyde resins, mixtures of low molecular weight glycols, high molecular weight diols and triphenylmethane triisocyanates, polyamine resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc. These binders can be used individually or in combination with each other and other additives can be added to the binders. The mixing ratio by weight of a ferromagnetic powder and binder is 10 to 400 parts by weight, preferably 30 to 200 parts by weight of the binder to 300 parts by weight of the ferromagnetic powder.

In addition to the above described binder and ferromagnetic fine powder, other additives such as dispersing agents, lubricants, abrasives, antistatic agents and the like can be added to the magnetic recording layer.

The magnetic recording layer is formed by dissolving or dispersing the above described composition in an organic solvent and then coating the resulting solution or dispersion onto a non-magnetic support.

The non-magnetic support can have a thickness of about 3 to 50 $\mu$m, preferably 10 to 40 $\mu$m. Suitable materials which can be used for producing the support are polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc.

The magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like and other coating methods can be used. These methods are described in *Coating Kogaku (Coating Engineering)*, page 253 to 277, published by Asakura Shoten, Tokyo (Mar. 20, 1971).

The coating thickness is ordinarily 0.5 to 10 microns, preferably 0.8 to 6 microns on dry base.

Typical organic solvents which can be used in the present invention include ketones such as acetone, methyl ethyl ketone, methyl isobutyl ketone, cyclohexanone and the like, alcohols such as methanol, ethanol, propanol, butanol and the like, esters such as methyl acetate, ethyl acetate, butyl acetate, ethyl lactate, glycol monoethyl ether acetate and the like, ethers and glycol ethers such as diethyl ether, glycol monoethyl ether, glycol dimethyl ether, dioxane and the like, aromatic hydrocarbons such as benzene, toluene, xylene and the like, chlorinated hydrocarbons such as methylene chloride, ethylene chloride, carbon tetrachloride, chloroform, ethylene chlorohydrin, dichlorobenzene and the like, tetrahydrofuran, dimethyl sulfoxide, etc. and these solvents can be used individually or in combination with each other.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following examples. All parts, percents, ratios and the like are those by weight unless otherwise indicated.

EXAMPLE 1

Using various magnetic substances, dispersions having the following compositions were prepared and used as a coating composition for forming a magnetic recording layer.

| Magnetic Powder | 100 parts |
| --- | --- |
| Vinyl Chloride/Vinyl Acetate Copolymer | 25 |
| Castor Oil (Lubricant, Dispersing Agent of Magnetic Powder) | 1 |
| Anionic Surfactant | 2 |
| Acrylic Acid Ester/Acrylonitrile Copolymer | 5 |
| Methyl Ethyl Ketone (Solvent) | Suitable |

Each of these coating compositions was coated onto a polyester film of 23µ in thickness to give a thickness of 12µ on dry base, dried, then subjected to a lustering treatment through supercalender and cut in a predetermined width to prepare a magnetic recording tape. This magnetic tape was allowed to stand in an atmosphere of 55° C. and 90% RH for 24 hours and an adhered substance generated on the surface of the magnetic recording layer was viewed.

In the case of Samples A-1 to A-13, $FeSO_4 \cdot 7H_2O$ and NaOH as an alkaline component were used at the time of goethite reaction, thus obtaining goethite with a grain size of about $0.6 \times 0.1 \times 0.1\mu$, and in the case of Sample A-1, in particular, water washing was not carried out. In the case of Samples A-2 to A-7, water washing was carried out with varying the water washing conditions at the time of goethite, followed by drying and further subjecting to the ordinary burning process of magnetic substances, i.e., dehydration-reduction-oxidation steps to obtain $\gamma\text{-}Fe_2O_3$. In Samples A-2 to A-4, in particular, subterranean water was used for water washing at the time of goethite as in the prior art and these samples therefore can be regarded as Comparative Examples. In Samples A-5 to A-7, on the other hand, distilled water was used instead the subterranean and the quantity of an adhered substance was considerably reduced as compared with the case of Samples A-1 to A-4.

In the following table, "Crystalline Substance" in the column "Quantity of Adhered Substance" shows the surface state of a magnetic recording layer viewed by means of a microscope, in which the case of a large quantity of a crystalline substance adhered is represented by "5" and the case of no crystalline substance is represented by "0". Similarly, the column "Guide Pole" shows the quantity of a substance adhered to a guide pole examined with the naked eye when the magnetic recording tape is subject to a tape recorder, in which the case of a large quantity of an adhered substance is represented by "5" and the case of no adhered substance is represented by "0."

In the case of Samples A-8 to A-13, water washing was carried out after $\gamma\text{-}Fe_2O_3$ and it was found as to Sample A-8 to A-10 that an adhered substance was decreased by water washing for a long time. In Samples A-11 to A-13, distilled water was used at the time of water washing and reaction and in this case, an adhered substance was markedly decreased by the water washing.

In the case of Samples B-1 to B-14, ammonia was used as an alkali at the time of goethite reaction. In this case also, an adhered substance occurred when subterranean water was used for water washing at the time of goethite reaction as in the prior art (Samples B-1 to B-3), but an adhered substance was decreased when the water washing was carried out after $\gamma\text{-}Fe_2O_3$ or when distilled water was used (Samples B-4 to B-14).

In the case of Samples C-1 to C-4, cobalt ions was added when goethite was precipitated from $FeSO_4$ and NaOH. Samples C-1 and C-2 showed the state of magnetite, in which there was found no adhered substance when water washing was carried out with distilled water and Samples C-3 and C-4 showed an intermediate oxidation product of $Fe_3O_4$ and $Fe_2O_3$ during the steps of dehydration-reduction-oxidation of goethite, in which water washing with distilled water was also found effective.

In the case of Samples D-1 to D-3 using the commercially used $\gamma\text{-}Fe_2O_3$, large amounts of adhered substances occurred.

Analysis of the adhered substances occurred in these experiments gave the following results. Firstly, there were found crystals by means of a microscope as shown in the accompanying drawing, which had a low solubility in water. Furthermore, the non-dispersion X-ray analysis taught the presence of elements Ca and S. In this case, it is considered that these elements are present in the form of $CaSO_4$, $CaSO_4 \cdot 1/2H_2O$, $CaSO_4 \cdot 2H_2O$, $CaS$, $CaSO_3 \cdot 2H_2O$, $CaS_2O_3 \cdot 6H_2O$, etc., but in view of the starting reaction materials, crystal form and color, the form can be regarded as $CaSO_4 \cdot xH_2O$, possibly, $CaSO_4 \cdot 2H_2O$. Since this is generally a compound which is hardly soluble in water, it is difficult to conclude that such a compound is deposited when a magnetic tape is exposed to a high humidity atmosphere, but, in fact, no adhered substance occurred when distilled water was used for water washing or reaction. Thus, when the subterranean water used in the prior art was subjected to chemical analysis, it was found that calcium ions were contained therein in an amount of 10 to 100 ppm and Ca in $CaSO_4 \cdot xH_2O$ was contained in the water used during the reaction or water washing.

| Sample No. | Production of Magnetic Substance | Water Washing Condition | Crystalline Substance | Guide Pole | Remarks |
|---|---|---|---|---|---|
| A-1 | A($FeSO_4$ + NaOH) | No | 5 | 5 | |
| | | Water Washing at Goethite | | | |
| A-2 | | Subterranean Water | | | |
| | | 18° C. 10 hr | 4 | 4 | |
| A-3 | | 18° C. 24 hr | 4 | 4 | |
| A-4 | | 18° C. 48 hr | 4 | 4 | |
| A-5 | | Distilled Water | | | |
| | | 18° C. 10 hr | 3 | 3 | Distilled water is |
| A-6 | | 18° C. 24 hr | 1.5 | 2 | also used at the |
| A-7 | | 18° C. 48 hr | 1 | 1 | time of goethite reaction. |
| | | Water Washing at $\gamma$-$Fe_2O_3$ | | | |
| A-8 | | Subterranean Water | | | |
| | | 18° C. 10 hr | 2 | 2 | Subterranean water |
| A-9 | | 18° C. 24 hr | 1 | 1 | is used for water |
| A-10 | | 18° C. 48 hr | 0 | 0 | washing at goethite. |
| A-11 | | Distilled Water | | | |
| | | 18° C. 10 hr | 0.5 | 1 | Distilled water is |
| A-12 | | 18° C. 24 hr | 0 | 0 | also used at the |
| A-13 | | 18° C. 48 hr | 0 | 0 | time of goethite reaction and goethite water washing. |
| B-1 | B($FeSO_4$ + $NH_4OH$) | Water Washing at Goethite | | | |
| | | Subterranean Water | | | |
| | | 18° C. 10 hr | 4 | 4 | |
| B-2 | | 18° C. 24 hr | 4 | 4 | |
| B-3 | | 18° C. 48 hr | 4 | 4 | |
| B-4 | | Distilled Water | | | |
| | | 18° C. 10 hr | 2.5 | 2.5 | Distilled water is |
| B-5 | | 18° C. 24 hr | 1 | 1 | also used at the |
| B-6 | | 18° C. 48 hr | 1 | 1 | time of goethite reaction. |
| B-7 | | Water Washing at $\gamma$-$Fe_2O_3$ | | | |
| | | Subterranean Water | | | |
| | | 18° C. 10 hr | 2 | 2 | Subterranean water is |
| B-8 | | 18° C. 24 hr | 1 | 1 | used at the time of |
| B-9 | | 18° C. 48 hr | 1 | 1 | goethitewater washing. |
| B-10 | | Distilled Water | | | Distilled water is |
| | | 18° C. 10 hr | 0.5 | 1 | used at the time of |
| | | 18° C. 24 hr | 0 | 0 | goethite reaction |
| | | 18° C. 48 hr | 0 | 0 | and goethite water washing. |
| C-1 | C(Addition of Co to A) Magnetite | Water Washing at Goethite only | 4 | 4 | Subterranean Water at 18° C. 24 hr |
| C-2 | " | Water Washing at Goethite and Magnetite 18° C. 24 hr | 0 | 0 | Distilled Water |
| C-3 | Intermediate Oxidation Product | Water Washing at Goethite only | 4 | 4 | Subterranean Water 18° C. 24 hr |
| C-4 | " | Water Washing at Goethite and Intermediate Oxidation product 18° C. 24 hr | 0 | 0 | Distilled Water |
| D-1 | D(Commercially Sold Article) a | | 4 | 4 | |
| D-2 | b | | 4 | 4 | |
| D-3 | c | | 4 | 4 | |

Note: Quantity of adhered substance decreass with the order of 5, 4, 3, 2, 1 and 0, and in the case of 0, no adhered substance is found.

From these data, the following points are concluded:

(1) In the commercially sold articles, adhered substances occur and, therefore, $CaSO_4 \cdot xH_2O$ is contained therein.

(2) An adhered substance cannot be removed by washing with water containing calcium ions at the time of goethite.

(3) When water washing is carried out after the dehydration, reduction or oxidation, an adhered substance is decreased even if the washing water contains calcium ions. This is possibly due to that since the magnetic substance after the dehydration or reduction has a pH of acidity in many cases, $CaSO_4 \cdot xH_2O$ is thereby dissolved to remove sulfate ions.

(4) The most effective method is to use water free from calcium ions at the time of the reaction and water washing.

EXAMPLE 2

After a magnetic recording substance was allowed to stand in an atmosphere of 55° C. and 90% RH for 24 hours, the relationship between the content of calcium ions in the ferromagnetic powder used in the magnetic recording substance and the quantity of an adhered substance occurring on the surface of the magnetic recording layer was examined, thus obtaining the following results. Samples used herein correspond to Samples A-2, A-5, A-6 and A-7 of Example 1 and the representation as to the quantity of an adhered substance is analogous to that of Example 1. The content of calcium ion was measured by the fluorescence X-ray quantitative analysis and atomic absorption quantitative analysis.

| Sample No. | Content of Ca ion | | Quantity of Adhered Substance |
|---|---|---|---|
| Ferromagnetic Substance | | | |
| Sample A-2 | 0.01 % | by weight | 4 |
| Sample A-5 | 0.005 | " | 3 |
| Sample A-6 | 0.003 | " | 1.5 |
| Sample A-7 | 0.001 | " | 1 |

What is claimed is:

1. A magnetic recording substance comprising a non-magnetic support member and a magnetic recording layer provided thereon and consisting essentially of a ferromagnetic powder and a binder, the ferromagnetic powder being selected from the group consisting of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds of $\gamma$-$Fe_2O_3$ and $Fe_3O_4$, $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, having a particle size of about 0.2 to 1 micron in length and a length to width ratio of 1:1 to 20:1, containing at most 0.001% by weight of calcium ions and being prepared by (a) reacting calcium ion-free starting materials to prepare goethite; (b) washing said goethite with calcium ion-free water; (c) subjecting the goethite of (b) to dehydration and reduction and (d) washing the product of (c) with calcium ion-free water.

2. The magnetic recording substance as claimed in claim 1, wherein the content of calcium ions contained in the ferromagnetic powder is reduced by the use of reaction materials and washing water which contain sulfate ions as little as possible.

3. The magnetic recording substance as claimed in claim 1, wherein rewashing with water is carried out after the dehydration and reduction of goethite.

4. The magnetic recording substance as claimed in claim 1, wherein the binder is selected from the group consisting of thermoplastic resins, thermosetting resins and mixtures thereof.

5. The magnetic recording substance as claimed in claim 1, wherein the non-magnetic support member is of a material selected from the group consisting of polyesters, polyolefins, cellulose derivatives and polycarbonates.

* * * * *